United States Patent
Hobrecht (10) Patent No.: US 6,177,787 B1
(45) Date of Patent: Jan. 23, 2001

(54) CIRCUITS AND METHODS FOR CONTROLLING TIMING AND SLOPE COMPENSATION IN SWITCHING REGULATORS

(75) Inventor: Stephen W. Hobrecht, Los Altos, CA (US)

(73) Assignee: Linear Technology Corporation, Milpitas, CA (US)

( * ) Notice: Under 35 U.S.C. 154(b), the term of this patent shall be extended for 0 days.

(21) Appl. No.: 09/383,459

(22) Filed: Aug. 26, 1999

Related U.S. Application Data (60) Provisional application No. 60/099,908, filed on Sep. 11, 1998.

(51) Int. Cl.[7] .................................................... G05F 1/56
(52) U.S. Cl. ........................................... 323/283; 323/288
(58) Field of Search ..................................... 323/283, 284, 323/285, 288, 271

(56) References Cited

PUBLICATIONS

Linear Technology Corporation, 1630 McCarthy Blvd., Milpitas CA 95035, "LTC1155, Dual High Side Micropower MOSFET Driver", <http://www.linear-tech.com>, (No Date).

Linear Technology Corporation, 1630 McCarthy Blvd., Milpitas CA 95035, "LTC1435, High Efficiency Low noise Synchronous Step–Down Switching Regulator", <http://www.linear-tech.com>, (No Date).

Linear Technology Corporation, 1630 McCarthy Blvd., Milpitas CA 95035, "LTC1438/LTC1439, Dual High Efficiency, Low Noise, Synchronous Step–Down Switching Regulators", <http://www.linear-tech.com>, (No Date).

Maxim Integrated Products, 120 San Gabriel Drive, Sunnyvale, CA 94086, "Max1630–1635, Multi–Output, Low–Noise Power–Supply Controllers for Notebook Computers", <http://www.maxim-ic.com>, (No Date).

Semtech Corporation, 652 Mitchell Road, Newbury Park, CA 91320, "SC1144, Programmable, High Performance Multi–Phase, PWM Controller", <http://www.semtech.com>, (No Date).

*Primary Examiner*—Jessica Han
(74) *Attorney, Agent, or Firm*—Fish & Neave; Matthew T. Byrne (57) ABSTRACT

Circuits and methods for controlling timing and slope compensation in switching regulators are provided. These circuits and methods include a timing control circuit that controls the timing of the switching of one or more switching regulator output stages so that the switching occurs at evenly spaced time intervals, and a slope compensation circuit that produces a slope compensation signal having a waveform that need not match the waveform of any oscillator signal, nor that need have the same period as the oscillator signal. Timing control is performed by dividing a master clock signal using a T flip-flop and a "rolling clock" (or "Johnson counter") to produce 2N clock phase signals. Slope compensation is provided by generating a slope compensation signal using decoding logic, a digital-to-analog converter (DAC), and an integrator.

24 Claims, 5 Drawing Sheets

CIRCUITS AND METHODS FOR CONTROLLING TIMING AND SLOPE COMPENSATION IN SWITCHING REGULATORS

CROSS REFERENCE TO RELATED APPLICATION

This application claims the benefit of U.S. provisional patent application No. 60/099,908, filed Sep. 11, 1998.

BACKGROUND OF THE INVENTION

The present invention relates to switching regulator circuits. More particularly, the present invention relates to circuits and methods for controlling timing and slope compensation in switching regulator circuits.

The purpose of a voltage regulator is to provide a predetermined and substantially constant output voltage to a load from a voltage source which may be poorly-specified or fluctuating. In a typical linear voltage regulator, the voltage at the regulator output is regulated by controlling the flow of current passing through a pass element (such as a power transistor) from the voltage source to the load.

In typical switching voltage regulators, however, the flow of current from the voltage source to the load is not steady, but rather is in discrete current pulses. To convert these discrete current pulses into a steady load current, typical switching regulators employ an inductive energy storage element. To create the discrete current pulses, typical switching regulators also employ a switch (such as a power transistor) that is coupled either in series or parallel with the load. By controlling the duty cycle of this switch (i.e., the percentage of time that the switch is ON relative to the total period of the switching cycle), the switching voltage regulator can regulate the voltage at the load. In a current-mode switching voltage regulator (i.e., a switching regulator that is controlled by a current signal in the regulator), the regulator can become unstable when the duty cycle exceeds 50% (i.e., when the switch is ON for more than 50% of a given switching period). Stability is often maintained in such current-mode switching voltage regulators by adjusting the current signal used to control the regulator with a slope compensation signal.

One method of producing the slope compensation signal is to use a portion of an oscillator signal as the compensation signal. Such an oscillator signal may be, for example, a sawtooth waveform that is also used to generate a clock signal used to control the switching of the regulator. Using a portion of an oscillator signal as the slope compensation signal may be ineffective, however, when the oscillator signal does not have the desired waveform or is out of phase with the desired slope compensation signal. For example, when the oscillator signal is a square wave, using the oscillator signal as the slope compensation signal may be ineffective because it may be undesirable to have a drastic change in the slope compensation signal on the leading edge of the oscillator signal and to have only a two-level slope compensation signal. As another example, when the oscillator signal is a sawtooth waveform, using the oscillator signal as the slope compensation signal may be ineffective because it may be undesirable to have a linear increase in the slope compensation signal. As still another example, with any type of oscillator waveform, using the oscillator signal as the slope compensation signal may be ineffective because the switching of the regulator may be out of phase with the oscillator signal, and therefore, the desired slope compensation signal may also be out of phase with the oscillator signal.

In some switching regulators, it is common to connect to a single input power source multiple switching output stages that are synchronized to a common clock signal and that each produce a different output voltage. Similarly, output stages of multiple switching regulators are also commonly connected in parallel to a single input power source and synchronously operated based on a common clock signal. However, when each of the switches in these output stages turn ON simultaneously because they are connected to a single clock signal, excessive ripple currents may be induced in the input and output currents of the output stages. For example, the peak input ripple current is roughly equal to the combined sum of all of the peak inductor currents. As this input ripple current increases, power loss increases dramatically since the root-mean-squared (RMS) power lost in the equivalent source resistance (ESR) of the input capacitance is proportional to the square of the input current. Consequently, low equivalent series resistance input and output capacitances must frequently be provided in these output stages and switching regulators to minimize the loss due to these ripple currents.

In view of the foregoing, it would be desirable to provide switching regulator circuits that produce a slope compensation signal having a waveform that need not match the waveform of any oscillator signal.

It would also be desirable to provide switching regulator circuits that produce a slope compensation signal having a period that need not be the same as the oscillator period.

It would further be desirable to provide switching regulator circuits that reduce input and output ripple currents from the magnitudes induced by simultaneous switching of multiple output stages.

SUMMARY OF THE INVENTION

It is therefore an object of the present invention to provide switching regulator circuits that produce a slope compensation signal having a waveform that need not match the waveform of any oscillator signal.

It is also an object of the present invention to provide switching regulator circuits that produce a slope compensation signal having a period that need not be the same as the oscillator period.

It is a further object of the present invention to provide switching regulator circuits that prevent excessive input and output ripple currents from being induced by simultaneous switching of multiple output stages.

In accordance with these and other objects of the invention, there are provided switching regulator circuits and methods that include a timing control circuit that controls the timing of the switching of one or more switching regulator output stages so that the switching occurs at evenly spaced time intervals, and a slope compensation circuit that produces a slope compensation signal having a waveform that may be different than the waveform of any oscillator signal, or that may have a different period than the oscillator signal.

Timing control is provided in the switching regulators of the present invention by generating evenly spaced clock phase signals that are used to control the switching of multiple switching regulator output stages. These clock phase signals are produced by dividing a master clock signal in half using a T flip-flop (to insure that the resultant signal has a 50% duty cycle), and then further dividing the resultant signal using a "rolling clock" (or "Johnson counter") formed from D flip-flops. When formed from N D flip-flops, the rolling clock provides 2N clock phase signals and runs at 1/(4N) of the master clock frequency. For example, with three D flip-flops, the rolling clock provides 6 clock phase signals and runs at 1/12 of the master clock frequency. Any of the clock phase signals provided by the rolling counter may be further decoded using another D flip-flop and an inverter to produce an output signal that is in quadrature phase with the decoded clock phase signal (i.e., lags one master clock signal period behind the decoded clock phase signal).

By dividing and decoding the master clock signal in this way, switching regulator timing control circuits can use master clock oscillators that operate at a much higher frequency than that at which the switching regulator is operating. Two advantages of using such higher-frequency oscillators are that they are typically smaller and less expensive than lower-frequency oscillators.

Using these phase signals, the switching times of multiple switching regulator output stages can be evenly spaced out over the course of a single regulator switching period so that RMS input current and induced ripple current (due to the effective increase in switching regulator frequency and non-overlap) are minimized. For example, with three output stages, phases one, three, and five can be used to space the output stages' switch-on times 120 degrees apart in the regulator switching period. As another example, with four output stages, phase one, an output signal in quadrature phase with phase two, phase four, and the inverse of the output signal in quadrature phase with phase two can be used to space the output stages' switching times 90 degrees apart in the regulator switching period.

Slope compensation is provided in the switching regulators of the present invention by generating a slope compensation signal using decoding logic, a digital-to-analog converter (DAC), and an integrator. The decoding logic receives the halved clock signal and two or more of the phase signals from the timing control circuitry and decodes them into two or more counter bits and a reset bit. During a first portion of the switching regulator period (e.g., the first third of the period), the reset bit is HIGH and the counter bits are LOW. During a second portion of the switching regulator period (e.g., the second two-thirds of the period), the reset bit is LOW and the counter bits count from zero through to the maximum count (based upon the number of counter bits) for each tick of the halved clock signal.

Responsive to these counter bits, the DAC draws current from the integrator using two or more parallel current sources. For example, with two counter bits and three current sources, a first current source may always draw a first amount of current from the integrator, a second current source may draw a second amount of current from the integrator only when a least-significant counter bit (LSB) is HIGH, and a third current source may draw a third amount of current from the integrator only when a most-significant counter bit (MSB) is HIGH. In this way, four different amounts of current may be drawn from the integrator by the DAC: the first amount of current only, the total of the first and second amounts of current, the total of the first and third amounts of current, and the total of the first, second, and third amounts of current.

The current drawn by the current sources of the DAC is integrated by the integrator to produce an integrator output voltage. At the beginning of each switching regulator period, the integrator is reset whenever the reset bit of the decoder circuitry is HIGH. Once the reset bit becomes LOW, a capacitor in the integrator charges as current is drawn out of the capacitor's negative terminal and as current is provided to the capacitor by an operational amplifier in the integrator. The voltage across this capacitor, as offset by a reference voltage, is provided to a voltage controlled current source connected to the output of the integrator as the voltage form of the slope compensation signal. The output of the voltage controlled current source then provides a current that is proportional to the integrator capacitor voltage to the switching regulator's control circuitry.

By generating a slope compensation signal in this way, the switching regulator period can be variable over a wide frequency range while providing constant slope correction. This is achieved in the present invention by producing the different levels in the slope compensation signal at certain percentage points within the switching regulator period, no matter what that period may be, rather than by producing the different levels in the slope compensation signal over a time period that is merely based upon a predetermined and fixed switching regulator period.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
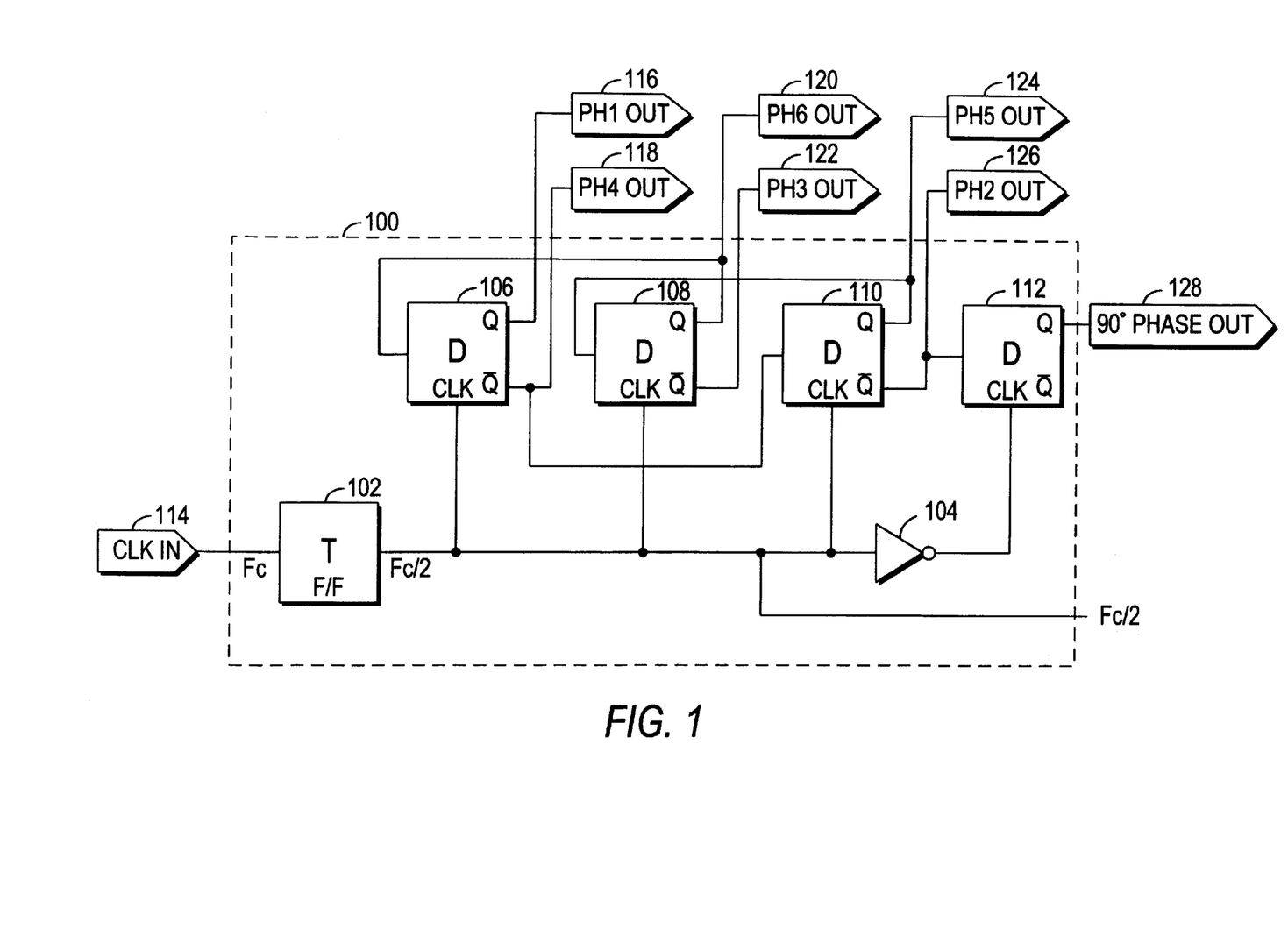
FIG. 1 is a schematic diagram of one embodiment of a timing control circuit in accordance with the principles of the present invention.

FIG. 1 shows a schematic diagram of one embodiment of a timing control circuit 100 in accordance with the present invention. As shown, timing control circuit 100 incorporates a T flip-flop 102, an inverter 104, and D flip-flops 106, 108, 110, and 112. T flip-flop 102 receives a clock input signal Fc from clock input terminal 114. T flip-flop 102 divides the frequency of signal Fc in half to provided a halved clock input signal Fc/2. By dividing the clock input signal Fc in half in this manner, circuit 100 insures that the resultant signal has a 50% duty cycle even though the clock input signal Fc may not. Signal Fc/2 is then provided to inverter 104 and D flip-flops 106, 108, and 110. Inverter 104 inverts signal Fc/2 and provides an inverted signal Fc/2 to D flip-flop 112.

D flip-flops 106, 108, and 110 form a "rolling clock" (or "Johnson counter"). As illustrated, signal Fc/2 is provided to the clock input terminal of each D flip-flop 106, 108, and 110. The input to D flip-flop 106 is provided by the non-inverted output of D flip-flop 108. The input to D flip-flop 108 is provided by the non-inverted output of D flip-flop 110. The input to D flip-flop 110 is provided by the inverted output of D flip-flop 106. Through this configuration, the rolling clock provides phase signals PH1, PH2, PH3, PH4, PH5, and PH6 at terminals 116, 126, 122, 118, 124, and 120 from the non-inverted output of D flip-flop 106, the inverted output of D flip-flop 110, the inverted output of D flip-flop 108, the inverted output of D flip-flop 106, the non-inverted output of D flip-flop 110, and the non-inverted output of D flip-flop 108, respectively. Each of these phase signals PH1, PH2, PH3, PH4, PH5, and PH6 is a square wave that goes HIGH on consecutive rising edges of signal Fc/2 and remains HIGH for three periods of signal Fc/2.

Although three D flip-flops 106, 108, and 110 are shown in FIG. 1, any number of D flip-flops, or any other suitable devices or combination of devices, could be used to provide phase signals from a timing control circuit in accordance with the present invention. Similarly, although one T flip-flop 102 is shown in FIG. 1, any number of T flip-flops, or any other suitable device, could be used to divide the clock input down to a suitable frequency. For example, a suitably programmed microprocessor could be used to provide the signals provided by any or all of D flip-flops 106, 108, and 110, and T flip-flop 102. Although the phase signals produced by timing control circuitry are evenly spaced and square waves, any other desired spacing and waveform could be used in accordance with the present invention.

D flip-flop 112 provides a quadrature phase output in timing control circuit 100 of FIG. 1. As shown, D flip-flop 112 receives an inverted signal Fc/2 from inverter 104. The input to D flip-flop 112 is received from the inverted output of D flip-flop 110. The output of D flip-flop 112 provides a quadrature phase output signal that is delayed by one half of the period of signal Fc/2 from the phase signal to which the input of D flip-flop 112 is connected (in this case PH2), but otherwise has the same period and duty cycle as the phase signal to which the input of D flip-flop 112 is connected.

Although only a single quadrature-phase-outputting D flip-flop 112 is shown in FIG. 1 as being connected to phase signal PH2, any number of quadrature-phase-outputting D flip-flops that may be connected to any one or more phase signals may be used in accordance with the present invention. Also, although a D flip-flop 112 and an inverter 104 are shown in FIG. 1 as being used to provide the quadrature phase output, any other suitable devices or combination of devices could be used to provide this output in accordance with the present invention. For example, a suitably programmed microprocessor could be used to provide the signals provided by D flip-flop 112 and inverter 104.

Figure 2:
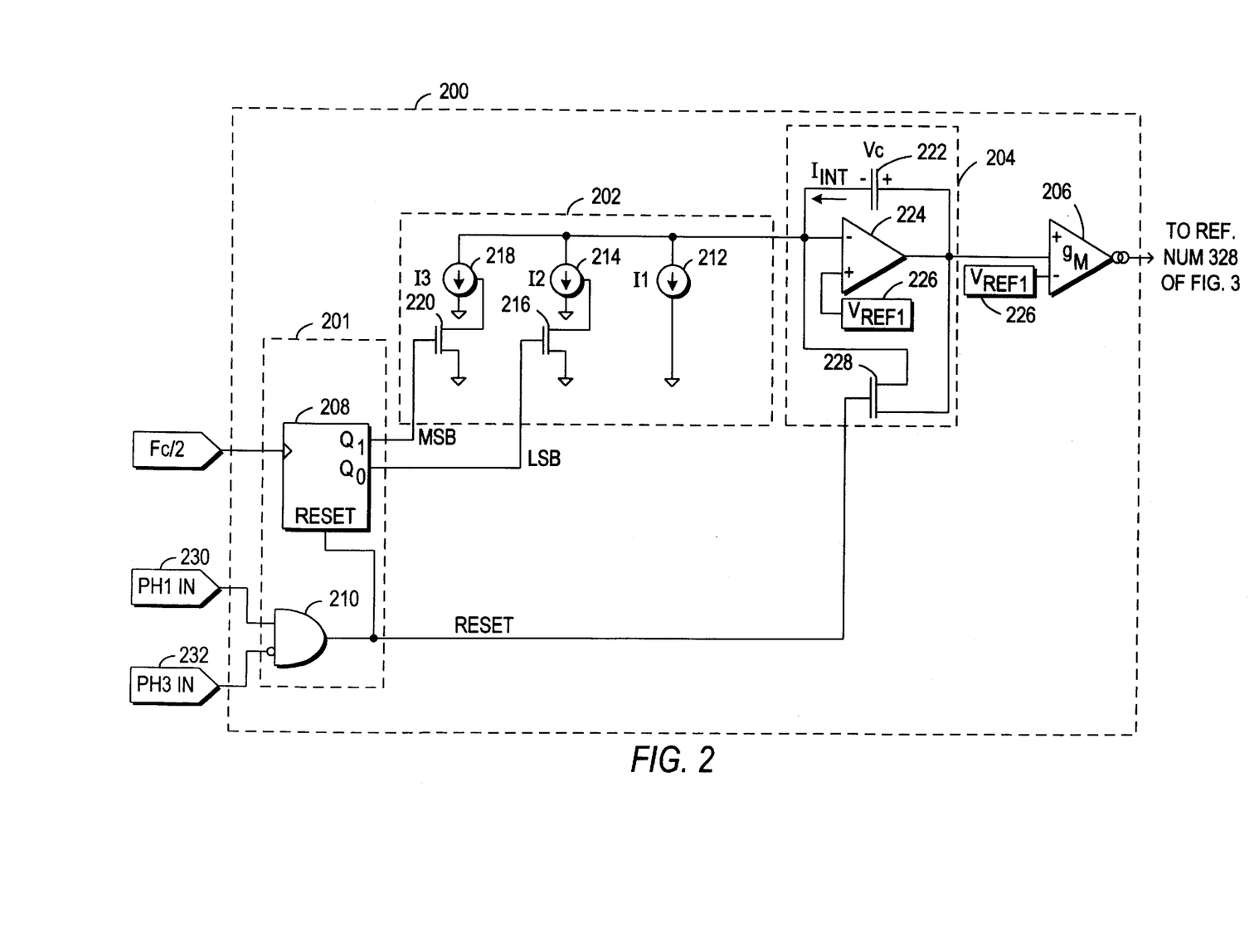
FIG. 2 is a schematic diagram of one embodiment of a slope compensation circuit in accordance with the principles of the present invention.

FIG. 2 illustrates a slope compensation circuit 200 in accordance with the present invention. As shown, circuit 200 comprises decoding circuitry 201, a digital-to-analog converter (DAC) 202, an integrator 204, and a voltage controlled current source 206.

Decoder circuitry 201 is formed from a two bit counter 208 and a logic device 210 that is simply an AND gate with one of its inputs inverted. The non-inverted input to logic device 210 is received from phase signal PH1 of timing control circuit 100 and the inverted input to logic device 210 is received from phase signal PH3 of timing control circuit 100. The output of logic device 210 is a reset signal that is used to reset counter 208 and integrator 204 when the reset signal goes HIGH. The clock input to counter 208 is provided by signal Fc/2 of timing control circuit 100. For each rising edge of signal Fc/2 when the reset signal is LOW, the output bits at the output of counter 208 increment. These output bits are labeled MSB for most significant bit and LSB for least significant bit and count in the following order: 00; 01; 10; and 11, where the first digit is the MSB and the second digit is the LSB, and where counter 208 is set to 00 upon its reset input going HIGH.

Although a two bit counter 208 and a particular logic device 210 are illustrated in FIG. 2 as part of decoder circuitry 201, any other suitably sized counter and any other suitable logic device could be used to provide a digital count and a reset signal in accordance with the present invention.

Digital-to-analog converter (DAC) 202 is formed from three current sources 212, 214, and 218, and two field effect transistors (FETs) 216 and 220 that act as ON/OFF switches. As shown, DAC 202 draws current from integrator 204 into current sources 212, 214, and 218. Current source 212 always draws current from integrator 204, current source 214 draws current from integrator 204 when the LSB of counter 208 is HIGH, and therefore FET 216 is conductive, and current source 218 draws current from integrator 204 when the MSB of counter 208 is HIGH, and therefore FET 220 is conductive. In this configuration, as the count at the output bits of counter 208 increases from 00 through 11, the amount of current drawn from integrator 204 also increases. Preferably, current sources 212, 214, and 218 are sized so that current source 214 is equal to current source 212, and current source 218 is twice as large as current source 214.

Although DAC 202 is illustrated as having three current sources 212, 214, and 218, and only two of these are shown as being switched, any number of current sources could be used in a digital-to-analog converter, and any number of those current sources could be switched, in accordance with the present invention. Current sources 212, 214, and 218 can be any suitable current sources known in the art. Although FETs 216 and 220 are shown in FIG. 1 as controlling when current sources 214 and 218 draw current, any other suitable switching device or circuit known in the art may be used in accordance with the present invention.

Integrator 204 is formed from a capacitor 222, an operational amplifier 224, and a field effect transistor (FET) 228. As shown, the negative terminal of capacitor 222 is connected to the negative input of operational amplifier 224, the source of FET 228, and the output of DAC 202. The positive terminal of capacitor 222 is connected to the output of operational amplifier 224, the drain of FET 228, and the positive input of voltage controlled current source 206. Both the positive input of operational amplifier 224 and the negative input of voltage controlled current source 206 are connected to a voltage reference (VREF1) 226. The output of voltage controlled current source 206 provides the slope compensation signal to an output stage of a switching regulator as is discussed further below in connection with FIG. 3.

Integrator 204 integrates the current drawn from DAC 202 by first being reset whenever the reset signal provided by the output of logic device 210 of decoder circuitry 201 goes HIGH. When this HIGH reset signal is received at the gate of FET 228, FET 228 discharges capacitor 222 by conducting current between the terminals of capacitor 222. Once the reset signal goes LOW, capacitor 222 begins to charge as current is drawn out of its negative terminal by DAC 202. Simultaneous with the charging of capacitor 222, operational amplifier 224 maintains the voltage at its output at an amount equal to the voltage across capacitor (VC) 222 plus the voltage at voltage reference (VREF1) 226. This output voltage at operational amplifier 224 is then provided to voltage controlled current source 206, where the voltage of reference voltage (VREFl) 226 is subtracted from the operational amplifier output voltage and a slope compensation current proportional to the voltage across capacitor 222 is provided to a switching regulator output stage.

Although DAC 202 and integrator 204 in circuit 200 are illustrated such that DAC 202 draws current from integrator 204 and integrator 204 integrates this drawn current, any suitable digital-to-analog converter and integrator pair or digital integration followed by a digital-to-analog converter could be used to convert a digital count output and a reset signal into a slope compensation signal in accordance with the present invention. Also, although the slope compensation signal output by circuit 200 is a current-based signal, a voltage-based signal, such as that at the output of operational amplifier 224, could also be used in accordance with the present invention.

Figure 3:
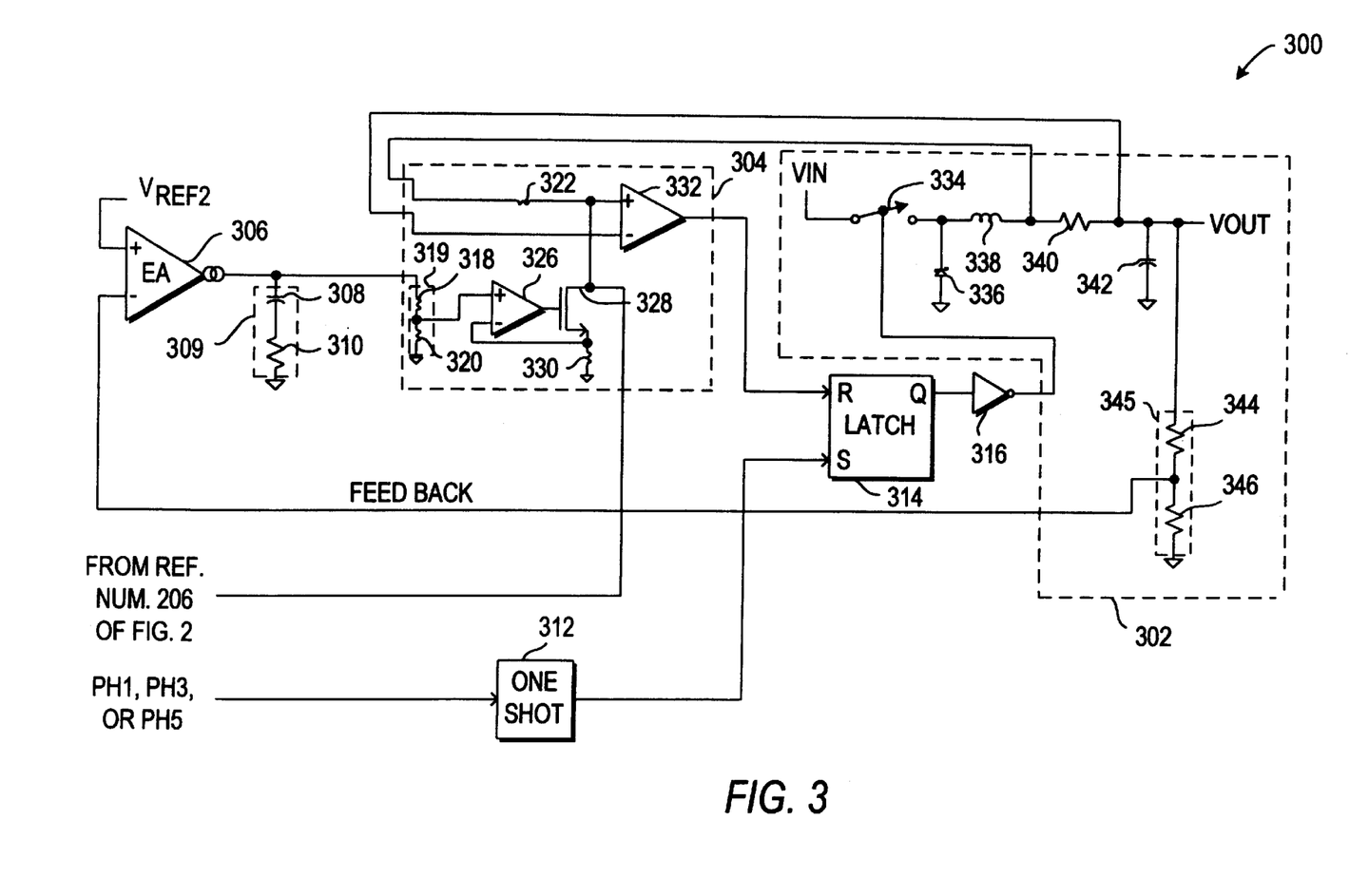
FIG. 3 is a schematic diagram of one embodiment of an output stage capable of being connected to the timing circuit shown in FIG. 1 and the slope compensation circuit shown in FIG. 2 in a switching regulator in accordance with the principles of the present invention.

FIG. 3 shows a schematic diagram of an output stage 300 that can be coupled to timing control circuit 100 of FIG. 1 and slope compensation circuit 200 of FIG. 2 in accordance with the present invention. As illustrated, output stage 300 includes output circuitry 302, a control circuit 304, an error amplifier 306, a one shot 312, a latch 314, an inverter 316, and a filter 309 that is formed from a capacitor 308 and a resistor 310.

Output circuitry 302 is formed from a switch 334, a schottky diode 336, an inductor 338, a current-sense resistor 340, a capacitor 342, and a voltage divider 345 that is formed from resistors 344 and 346. In circuitry 302, switch 334 is used to control the flow of current from a voltage source at the voltage input (VIN) to a load at the voltage output (VOUT). Switch 334 may be any suitable switching device, such as a field effect transistor (FET), that can be used to control the flow of current from the voltage source. When switch 334 is opened, diode 336 provides a current path through which inductor 338 can discharge energy stored in the inductor during the time that switch 334 is closed. Although a schottky diode is shown as providing this current path, other types of diodes or other devices, such as switches and transistors, could be used instead of a schottky diode to provide this current path. Inductor 338 is used to convert pulses of current drawn from the voltage source to a continuous flow of current at the load. Current-sense resistor 340 provides a mechanism through which the current flowing through inductor 338 can be measured in order to control the timing of the opening and closing of switch 334. Capacitor 342 smooths the output voltage provided at VOUT, and voltage divider 345 provides a measuring point for an output voltage feedback loop.

During operation, a switching cycle begins when switch 334 is first CLOSED and current flows from VIN through switch 334, inductor 338, and current-sense resistor 340 to capacitor 342, divider 345, and a load at VOUT. From the time switch 334 is initially CLOSED, the current flow through switch 334, inductor 338, and current-sense resistor 340 gradually increases as energy is stored in inductor 338. This current flow is monitored by measuring the voltage across current-sense resistor 340. At the same time, charge is also stored in capacitor 342 and an output voltage is provided at VOUT. This output voltage is monitored by measuring the voltage at voltage divider 345. Because diode 336 is reversed biased when switch 334 is closed, no current flows through diode 336 at that time.

When the current flow through resistor 340 reaches a certain level or the voltage at voltage divider 345 reaches a certain level, as is described further below, switch 334 will become OPENED. When this happens, current stops flowing from the voltage source at VIN, and the energy stored in inductor 338 causes current to flow through diode 336, inductor 338, and current-sense resistor 340 to capacitor 342, divider 345, and the load. As the energy stored in inductor 338 is discharged while the switch is OPENED, the current flowing out of inductor 338 gradually decreases, and, therefore, the voltage across resistor 340 drops. Similarly, as the voltage at the load draws current out of capacitor 342 with the decreasing current from inductor 338, the voltage measured at voltage divider 345 also drops. This decrease in current flow through the inductor and decrease in voltage at VOUT then enables switch 334 to be re-CLOSED so that the switching cycle can repeat itself.

The opening and closing of switch 334 is controlled by latch 314 and inverter 316. When a HIGH logic level is received at the set input (S) of latch 314, the output (Q) of the latch goes HIGH. This output remains HIGH until a HIGH logic level is received at the reset input (R) of latch 314. Inverter 316 inverts the HIGH or LOW output of latch 314, as the case may be, and drives switch 334 so that the switch is CLOSED when the latch output is HIGH and OPENED when the latch output is LOW.

The set input of latch 314 is driven by one shot 312, which is driven by a phase signal of timing control circuit 100 of FIG. 1. One shot 312 operates by producing an output pulse that goes HIGH for a predetermined period of time upon each rising edge of the input phase signal. Because the phase signals of timing control circuit 100 may be HIGH longer than the desired maximum time period that switch 334 is CLOSED, one shot 312 is used to provide a short pulse that will set latch 314.

The reset input of latch 314 is driven by control circuit 304. Control circuit 304 resets latch 314 (causing switch 334 to be OPENED) in response to the voltage at voltage divider 345, the slope compensation signal received from slope compensation circuit 200 of FIG. 2, and the current flowing through current-sense resistor 340.

As shown, control circuit 304 includes a current-sense comparator 332, resistors 322 and 330, an operational amplifier 326, an N-channel FET 328, and a voltage divider 319 that is formed from resistors 318 and 320. During operation, operational amplifier 326 measures the voltage at voltage divider 319. This voltage is determined by the current driven by error amplifier 306 into filter 309 and voltage divider 319, and is proportional to the error between the voltage at voltage divider 345 and a reference voltage (VREF2) connected to the positive input of error amplifier 306.

Operational amplifier 326 then drives FET 328 so that the voltage across resistor 330 matches that at voltage divider 319. As FET 328 is driven by operational amplifier 326, current is also supplied from slope compensation circuit 200 of FIG. 2 and drawn through resistor 322. However, when slope compensation circuit 200 of FIG. 2 is producing no current, all of the current drawn through resistor 322 is produced by FET 328.

As the current drawn by FET 328 passes through resistor 322, a voltage drop is created across resistor 322. Similarly, as current passes through resistor 340, a voltage drop is created across resistor 340 as well. Comparator 332 compares the resulting voltages and drives the reset input of latch 314 HIGH when the difference between these voltages goes positive. In this way, control circuit 304 controls when switch 334 is OPENED, and, therefore, controls the amount of current flowing through inductor 338 and the voltage provided at VOUT.

Figure 4:
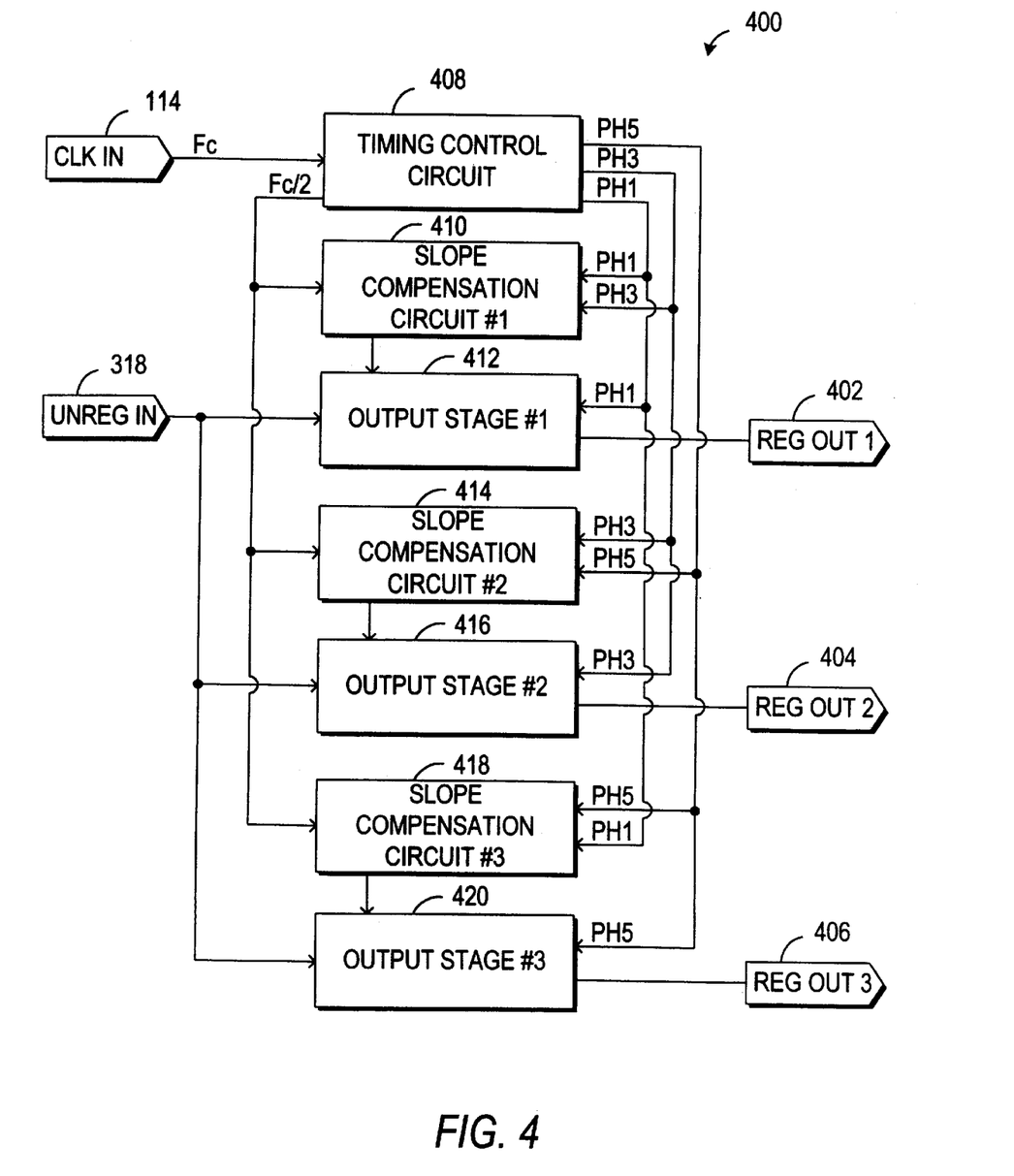
FIG. 4 is a block diagram of one embodiment of a switching regulator circuit comprising a timing control circuit, three slope compensation circuits, and three output stages in accordance with the principles of the present invention.

FIG. 4 illustrates a switching regulator circuit 400 that has multiple regulated outputs and that employs the timing and slope compensation features of the present invention. As shown, circuit 400 incorporates a single timing control circuit 408 that is substantially identical to circuit 100 of FIG. 1, three slope compensation circuits 410, 414, and 418 that are each substantially identical to circuit 200 of FIG. 2, and three output stages 412, 416, and 420 that are each substantially identical to circuit 300 of FIG. 3. It is preferable in switching regulator applications having multiple output stages in accordance with the present invention to provided a separate slope compensation circuit for each output stage to prevent sub-harmonic variation of the current tripping level (i.e., the current level at which the switch in the output stage becomes OPENED) in the current-mode feedback loop.

A clock input signal Fc is provided from a clock input terminal 114 to the input of T flip-flop 102 of timing control circuit 408. Timing control circuit 408 then provides a halved clock signal Fc/2 to the input of each counter 208 of slope compensation circuits 410, 414, and 418. Timing control circuit 408 also provides phase signals PH1 and PH3 to slope compensation circuit 410, phase signals PH3 and PH5 to slope compensation circuit 414, and phase signals PH5 and PH1 to slope compensation circuit 418 such that the first and second of each of these pairs of phase signals are connected to the non-inverted and inverted inputs, respectively, of each logic device 210 in circuits 410, 414, and 418. Timing control circuit 408 further provides phase signals PH1, PH3, and PH5 to the input of each one shot 312 of output stages 412, 416, and 420, respectively. Slope compensation circuits 410, 414, and 418 provide a slope compensation current from voltage controlled current source 206 to the drain of FET 328 of output stages 412, 416, and 420, respectively. Finally, the voltage input (VIN) of each output stage 412, 416, and 420 is connected to an unregulated voltage input terminal 318, and the voltage output (VOUT) of each of output stages 412, 416, and 420 provides regulated outputs at terminals 402, 404, and 406, respectively.

During operation, phase signals PH1, PH3, and PH5 are provided to output stages 412, 416, and 420 so that switches 334 in these output stages are CLOSED 120 degrees apart. More particularly, switch 334 in output stage 412 is CLOSED on the rising edge of phase signal PH1, switch 334 in output stage 416 is CLOSED on the rising edge of phase signal PH3, and switch 334 in output stage 420 is CLOSED on the rising edge of phase signal PH5. In this way, the timing of the closing of the switches in the output stages are kept as far apart in time as possible in order to minimize induced ripple currents in the inputs and output of the output stages.

Signal Fc/2 and phase signals PH1, PH3, and PH5 are provided to slope compensation circuits 410, 414, and 418 so that each can generate a slope compensation current to be provided to output stages 412, 416, and 420, respectively. By providing the particular pairs of phase signals listed above to each slope compensation circuit, the generation of the slope compensation signal is kept in phase with the closing of switches 334 in output stages 412, 416, and 420.

Although circuit 400 of FIG. 4 is illustrated as having a single timing control circuit 408, three slope compensation circuits 410, 414, and 418, and three output stages 412, 416, and 420, other numbers and types of timing control circuits, slope compensation circuits, and output stages can be used in switching regulator circuits in accordance with the present invention. Also, although particular phase signal connections are shown in FIG. 4, other phase signal connections could be used to achieve other timing arrangements in a switching regulator circuit in accordance with the present invention.

Figure 5:
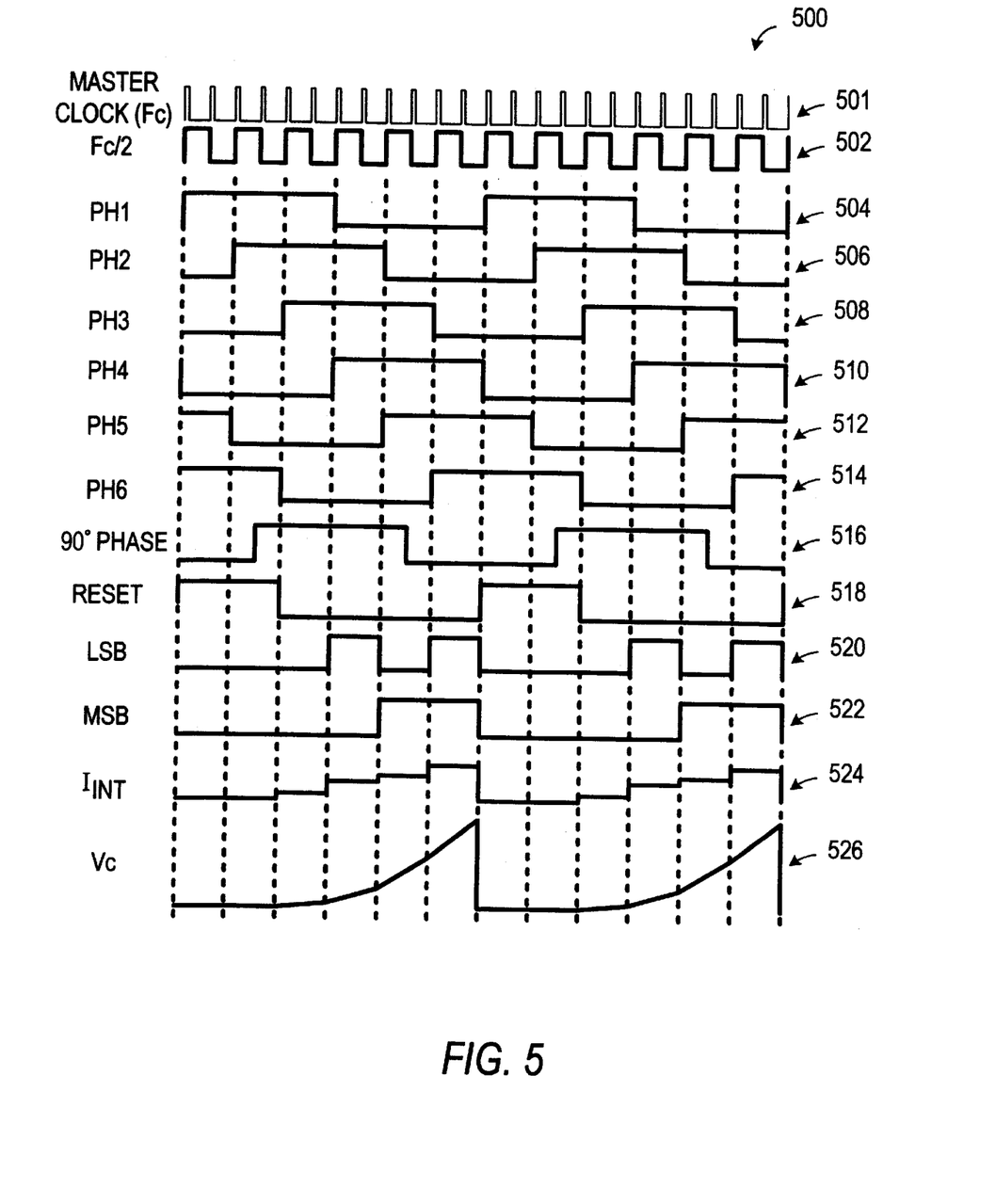
FIG. 5 is a general illustration of waveforms produced by the timing control circuit of FIG. 1 and the slope compensation circuit of FIG. 2 in accordance with the principles of the present invention.

A timing diagram 500 illustrating typical waveforms of signals that might be generated in circuits 100, 200, 300, and 400 of FIGS. 1–4 in accordance with the present invention is shown in FIG. 5. As can be seen, a master clock signal Fc 501 (whose duty cycle is not necessarily 50%) is divided in half to produce halved clock signal Fc/2 502 (whose duty cycle is 50%). Each phase signal PH1 504, PH2 506, PH3 508, PH4 510, PH5 512, and PH6 514 goes HIGH on a consecutive rising edge of halved clock signal Fc/2 502, and stays HIGH for three periods of signal Fc/2 502. Quadrature phase signal (or 90 degree phase signal) 516 follows phase signal PH2 506, from which it is generated, by one-half the period of signal Fc/2 502. Reset signal 518, as shown, is generated using logic device 210 and phase signals PH1 and PH3 as illustrated in FIG. 2. As can be seen, reset signal 518 goes HIGH for the first two periods of signal Fc/2 502 and then goes LOW for the following four periods of signal Fc/2 502. During the first two periods, counter 208 and integrator 204 of circuit 200 are reset, and during the next four periods counter 208 increments its count as shown in LSB signal 520 and MSB signal 522, and integrator 204 integrates the currents produced by DAC 202 as shown in integrator current signal (Iint) 524 and capacitor voltage signal (VC) 526.

Persons skilled in the art will appreciate that the principles of the present invention can be practiced by other than the described embodiments, which are presented for purposes of illustration and not of limitation, and the present invention is limited only by the claims which follow.

What is claimed is:

1. A control circuit that controls switch timing in a plurality of switching regulator output stages and generates at least one slope compensation waveform, comprising:
   a timing circuit, coupled to each of the output stages, that generates a plurality of phase signals from a clock signal, wherein each of the phase signals controls the switch timing of a different one of the output stages; and
   a slope compensation waveform generating circuit that receives at least two of the phase signals from the timing circuit and that generates a slope compensation waveform for at least one of the output stages.

2. The control circuit of claim 1 wherein the timing circuit comprises a plurality of D flip-flops.

3. The control circuit of claim 1 wherein the timing circuit comprises a frequency divider that divides a higher frequency clock signal to provide the clock signal.

4. The control circuit of claim 3 wherein the frequency divider is a T flip-flop.

5. The control circuit of claim 1 wherein the timing circuit further comprises a quadrature-phase output circuit that provides a quadrature-phase output signal having a rising edge that occurs at a time between a first signal rising time of a first adjacent one of the phase signals and a second signal rising time of a second adjacent one of the phase signals.

6. The control circuit of claim 5 wherein the quadrature-phase output circuit comprises:
   a D flip-flop that receives an input phase signal from the first adjacent one of the phase signals and that provides the quadrature-phase output signal; and
   an inverter that inverts the clock signal to provide an inverted clock signal to the D flip-flop.

7. The control circuit of claim 1, wherein the slope compensation waveform generating circuit comprises:
- decoder circuitry that receives a clock signal and the at least two of the phase signals, and that provides a plurality of counter bit outputs and a reset signal;
- a digital-to-analog converter that produces an output signal in response to the counter bit outputs provided by the decoder circuitry; and
- an integrator that integrates the output signal produced by the digital-to-analog converter to produce the slope compensation waveform and that is reset by the reset signal.

8. The control circuit of claim 7, wherein the decoder circuitry comprises:
- a counter that counts the clock signal to provide the counter bit outputs and that is reset by the reset signal; and
- a logic device that logically combines the output phase signals to produce the reset signal.

9. The control circuit of claim 8 wherein the logic device is an AND gate with an inverted input.

10. The control circuit of claim 7 wherein the digital-to-analog converter comprises a plurality of current sources that provide a current flow in response to the counter bit outputs of the decoder circuitry.

11. The control circuit of claim 10 wherein the digital-to-analog converter further comprises a plurality of switches that are responsive to the counter bit outputs and that control when the plurality of current sources provide the current flow in response to the counter bit outputs of the decoder circuitry.

12. The control circuit of claim 7 wherein the integrator comprises:
- a capacitor that stores charge in response to the output signal produced by the digital-to-analog converter;
- an operational amplifier that produces the slope compensation signal in response to the charge stored in the capacitor; and
- a switch that discharges the capacitor in response to the reset signal.

13. The control circuit of claim 7 further comprising a voltage controlled current source that provides a slope compensation current in response to the slope compensation signal.

14. A method for controlling a timing of switching signals and slope compensation waveforms of a plurality of switching regulator output stages comprising:
- receiving an input clock signal from a clock source;
- providing a plurality of output phase signals, wherein each of the plurality of output phase signals is used to control the switching of a unique one of the plurality of switching regulator output stages; and
- generating a corresponding slope compensation waveform for at least one of the plurality of switching regulator output stages using at least two of the plurality of output phase signals.

15. The method of claim 14 further comprising:
- reducing a master clock signal using a frequency divider to provide the input clock signal.

16. The method of claim 14 further comprising:
- providing a quadrature-phase output signal having a rising edge that occurs at a time between a first signal rising time of a first adjacent one of the plurality of output phase signals and a second signal rising time of a second adjacent one of the plurality of output phase signals.

17. The method of claim 16 wherein the providing of the quadrature-phase output signal comprises:
- receiving an input phase signal from the first adjacent one of the plurality of output phase signals;
- inverting the input clock signal to provide an inverted input clock signal; and
- generating the quadrature-phase output signal so that the quadrature-phase output signal matches the input phase signal at each rising edge of the inverted input clock signal.

18. A method for generating a slope compensation signal for a switching regulator output stage, comprising:
- receiving an input clock signal and a plurality of phase input signals;
- providing a plurality of counter bit outputs and a reset signal;
- producing an output signal in response to the counter bit outputs;
- integrating the output signal to produce the slope compensation signal; and
- resetting the output signal in response to the reset signal.

19. The method of claim 18, wherein the providing of the plurality of counter bit outputs and the reset signal comprises:
- counting the input clock signal to provide the counter bit outputs;
- resetting the counter bit outputs in response to the reset signal; and
- logically combining the plurality of phase input signals to produce the reset signal.

20. The method of claim 19 wherein the logically combining comprises:
- inverting one of the plurality of phase input signals to produce an inverted signal; and
- performing a logical AND on the inverted signal and another of the plurality of phase input signals.

21. The method of claim 18 wherein the producing of the output signal in response to the counter bit outputs comprises providing a current flow in response to the counter bit outputs.

22. The method of claim 21 wherein the producing of the output signal in response to the counter bit outputs further comprises switching the current flow using a plurality of switches that are responsive to the counter bit outputs.

23. The method of claim 18 wherein the integrating of the output signal to produce the slope compensation signal and the resetting of the output signal in response to the reset signal comprises:
- storing charge in response to the output signal;
- producing the slope compensation signal in response to the charge stored; and
- discharging the charge stored in response to the reset signal.

24. The method of claim 18 further comprising providing a slope compensation current in response to the slope compensation signal.

* * * * *

UNITED STATES PATENT AND TRADEMARK OFFICE
CERTIFICATE OF CORRECTION

PATENT NO. : 6,177,787 B1  Page 1 of 1
DATED : January 23, 2001
INVENTOR(S) : Stephen W. Hobrecht It is certified that error appears in the above-identified patent and that said Letters Patent is hereby corrected as shown below:

<u>Title page,</u>
Item [56], References Cited, insert
-- 5,929,620  *  7/1999   Dobkin et al. . . . . . . . .  323/288
   4,309,650  *  1/1982   Boros et al. . . . . . . . .  323/283

* cited by examiner --

Signed and Sealed this

Eighth Day of January, 2002

*Attest:*

*Attesting Officer*

JAMES E. ROGAN
*Director of the United States Patent and Trademark Office*